(12) United States Patent
Kellens et al.

(10) Patent No.: US 7,696,369 B2
(45) Date of Patent: Apr. 13, 2010

(54) OIL RECUPERATION PROCESS

(75) Inventors: Marc Kellens, Muizen (BE); Wim De Greyt, Sinaai (BE)

(73) Assignee: De Smet Engineering N.V., Zaventem (BE)

( * ) Notice: Subject to any disclaimer, the term of this patent is extended or adjusted under 35 U.S.C. 154(b) by 554 days.

(21) Appl. No.: 11/198,084

(22) Filed: Aug. 5, 2005

(65) Prior Publication Data

US 2006/0030012 A1    Feb. 9, 2006

(30) Foreign Application Priority Data

Aug. 6, 2004    (EP) .................... 04077255

(51) Int. Cl.
C11B 1/00    (2006.01)
(52) U.S. Cl. ...................................... 554/8
(58) Field of Classification Search ............. 554/8
See application file for complete search history.

(56) References Cited

U.S. PATENT DOCUMENTS

| | | | |
|---|---|---|---|
| 1,988,648 A | 6/1935 | Engelke |
| 2,461,694 A | 2/1949 | McCubbin et al. |
| 2,470,652 A | 5/1949 | Scofield |
| 2,571,143 A | 10/1951 | Leslie |
| 2,674,609 A | 4/1954 | Beal et al. |
| 2,678,327 A * | 5/1954 | Clayton ............ 554/180 |
| 2,691,830 A | 10/1954 | Karnofsky |
| 2,713,023 A | 7/1955 | Irvine |
| 2,746,168 A | 5/1956 | Rickabaugh |
| 2,804,427 A | 8/1957 | Suriano |
| 2,826,601 A | 3/1958 | Barsky |
| 2,983,612 A | 5/1961 | Eichberg |
| 3,310,487 A | 3/1967 | Johnson et al. |
| 3,367,034 A | 2/1968 | Good |
| 3,367,044 A | 2/1968 | Fitch |
| 3,392,455 A | 7/1968 | Klingsbaker, Jr. et al. |
| 3,634,201 A | 1/1972 | Kehse |
| 4,049,686 A | 9/1977 | Ringers et al. |
| 4,089,880 A | 5/1978 | Sullivan |
| 4,138,230 A | 2/1979 | Thompson |
| 4,164,506 A | 8/1979 | Kawahara et al. |
| 4,415,443 A | 11/1983 | Murphy |
| 4,601,790 A | 7/1986 | Stage |
| 4,664,784 A | 5/1987 | Harandi |
| 4,778,489 A | 10/1988 | Weber |
| 4,996,072 A | 2/1991 | Marschner et al. |
| 5,041,245 A | 8/1991 | Benado |
| 5,214,171 A | 5/1993 | Dijkstra et al. |
| 5,401,867 A | 3/1995 | Sitzmann et al. |
| 5,486,318 A | 1/1996 | McKeigue et al. |
| 6,001,220 A | 12/1999 | Hillström et al. |
| 6,013,817 A | 1/2000 | Stern et al. |
| 6,127,560 A | 10/2000 | Stidham et al. |
| 6,172,247 B1 | 1/2001 | Copeland et al. |
| 6,172,248 B1 | 1/2001 | Copeland et al. |
| 6,426,423 B1 * | 7/2002 | Copeland et al. ........ 554/179 |
| 6,623,604 B1 | 9/2003 | Elsasser et al. |
| 6,658,851 B2 | 12/2003 | Jellema et al. |
| 6,953,499 B2 | 10/2005 | Kellens et al. |
| 2002/0169033 A1 | 11/2002 | Sery |
| 2003/0070317 A1 | 4/2003 | Anderson et al. |
| 2005/0066823 A1 | 3/2005 | Kellens et al. |
| 2006/0057263 A1 | 3/2006 | Kellens et al. |
| 2008/0051599 A1 | 2/2008 | Adami et al. |
| 2008/0081097 A1 | 4/2008 | Kellens et al. |

FOREIGN PATENT DOCUMENTS

| | | |
|---|---|---|
| BE | 1005617 A3 | 11/1993 |
| DD | 265074 A1 | 2/1989 |
| DE | 382912 | 10/1923 |
| DE | 19520675 A1 | 12/1996 |
| EP | 0195991 A2 | 10/1986 |
| EP | 0520097 A1 | 12/1992 |
| EP | 1 157 615 A2 | 11/2001 |
| EP | 1505145 B1 | 6/2006 |
| EP | 1624047 B1 | 10/2006 |
| EP | 1637201 B1 | 8/2007 |
| EP | 1818088 A1 | 8/2007 |
| EP | 1894913 A1 | 3/2008 |
| EP | 1905815 A1 | 4/2008 |
| FR | 2103267 | 4/1972 |
| GB | 589534 | 6/1947 |
| GB | 777413 | 6/1957 |

(Continued)

OTHER PUBLICATIONS

U.S. Appl. No. 12/175,837, filed Jul. 18, 2008, Kellens et al.

(Continued)

*Primary Examiner*—Deborah D Carr
(74) *Attorney, Agent, or Firm*—Wegman, Hessler & Vanderburg

(57) ABSTRACT

The invention provides a process for recuperating a triglyceride oil from wet gums from a vegetable oil, said process comprising the steps of:
(a) providing wet gums by water de-gumming a crude vegetable oil,
(b) mixing said wet gums with water containing a phospholipolytic agent,
(c) allowing the mixture to separate into two or more phases, said two or more phases including at least an oily phase and an aqueous phase, and
(d) recuperating said oily phase.

25 Claims, No Drawings

FOREIGN PATENT DOCUMENTS

| | | |
|---|---|---|
| GB | 789777 | 1/1958 |
| GB | 816522 | 7/1959 |
| GB | 1229266 | 4/1971 |
| GB | 1400836 | 7/1975 |
| GB | 1424049 | 2/1976 |
| GB | 1429773 | 3/1976 |
| GB | 1561494 | 2/1980 |
| GB | 2100613 A | 1/1983 |
| GB | 2176713 A | 1/1987 |
| GB | 2451577 A | 2/2009 |
| WO | WO 86/04603 A1 | 8/1986 |
| WO | WO9953001 * | 10/1999 |
| WO | WO 02/062157 A2 | 8/2002 |
| WO | WO 2005/100519 A1 | 10/2005 |
| WO | WO 2007/082766 A1 | 7/2007 |

OTHER PUBLICATIONS

U.S. Appl. No. 12/175,859, Jul. 18, 2008, Van Damme.

Andersen, *Refining of Fats and Oils*, 2nd Ed., Pergamon Press, United Kingdom, 1962, pp. 187-199.

Erickson, *Practical Handbook of Soybean Processing and Utilization*, AOCC Press, Champaign, IL, 1995, pp. 246-249.

Kuroda et al., "An Edible Oil Deodorizer with a Direct-Fired Heater," *J. Am. Oil Chem. Soc.* 66:1781-1783, 1989.

Minifie et al., *Chocolate, Cocoa, and Confectionery, Science and Technology*, 2nd Ed., AVI Publishing Company, Inc., Westport, CT, 1980, pp. 67-88.

O'Brien et al., *Introduction to Fats and Oils Technology*, 2nd Ed., AOCS Press, Champaign, IL, 2000, pp. 256-258.

Van Gerpen et al., *Biodiesel Production Technology*, U.S. Department of Commerce, Jul. 2004.

Weber et al., "Fat Crystallizers with Stirring Surfaces: Theory and Practice," *OCL Oléagineux* 5:381-384, 1998.

English Language Explanation of BE 1005617 A3.

English Language Explanation of DE 19520675 A1.

European Search Report for European Patent Application No. 04077550 completed Feb. 17, 2005.

European Search Report for European Patent Application No. 06017333 completed Feb. 23, 2007.

European Search Report for European Patent Application No. 06020388 completed Mar. 28, 2007.

European Search Report for European Patent Application No. 07075709 completed Nov. 21, 2007.

European Search Report for European Patent Application No. 07075840 completed Jan. 29, 2008.

Office Action (U.S. Appl. No. 11/841,255), mailed Sep. 19, 2008.

Office Action (U.S. Appl. No. 11/226,758), mailed Aug. 18, 2008.

Office Action (U.S. Appl. No. 10/912,361), mailed Mar. 19, 2008.

Office Action (U.S. Appl. No. 10/912,361), mailed Nov. 13, 2008.

* cited by examiner

OIL RECUPERATION PROCESS

CROSS-REFERENCE TO RELATED APPLICATIONS

This application claims priority to European Patent Application 04077255.0 filed Aug. 6, 2004; the disclosure of which is hereby incorporated by reference.

FIELD OF THE INVENTION

The invention relates to a process for recuperating a vegetable oil from a mixture of a triglyceride oil and mucilaginous compounds, as for instance resulting from the water degumming step of crude vegetable oils.

BACKGROUND OF THE INVENTION

Edible oils as obtained by expelling and/or solvent extraction often require extensive purification. Accordingly, mucilaginous matter may be removed during a degumming step, and free fatty acids may be removed during a chemical neutralisation step by reacting them with caustic soda under formation of soaps. Colouring compounds may be removed during the a bleaching step wherein oil is treated with an adsorbent such as bleaching earth, and malodorous compounds may be removed during a deodorization step. This latter step can also serve the purpose of removing free fatty acids and is then commonly referred to as the steam refining or physical refining step.

For the removal of mucilaginous matter from a vegetable oil, a number of different processes are used. The most simple and oldest process is the water degumming process as described by Bolmann in German Patent 382 912. In this process, crude oil as obtained by solvent extraction of oilseeds or their expeller cake is treated with live steam after the extraction solvent has been removed by evaporation. The term "live steam" should be understood herein as meaning that steam is directed at the object being steamed and allowed to condense onto said object. This treatment causes the gums to be hydrated and form a separate phase that can then be isolated from the oil as wet gums which can then be dried to yield lecithin.

As explained in detail by W. van Nieuwenhuyzen, "Lecithin production and properties" in *Journal of the American Oil Chemists' Society* (1976) 53: 425-427, lecithin is a complex mixture of phosphatides (such as phosphatidyl choline, phosphatidyl ethanolamine, phosphatidyl inositol and phosphatidic acid), their lyso-compounds, triglycerides, sugars (such as saccharose, raffinose and stachyose), some glycolipids and further minor constituents, wherein lecithin normally contains some 35% by weight triglyceride oil.

This triglyceride oil contained in lecithin constitutes a manufacturing and/or commercial loss to the crushing industry (i.e. oil production from pressing oil seeds) since the addition of the lecithin or the wet gums to the meal only realises meal value, which is invariably lower than the oil value. Accordingly, attempts have been made to reduce this loss by recuperating oil from the wet gums or lecithin. U.S. Pat. No. 2,678,327 describes a process of treating crude glyceride oil containing gums, comprising de-gumming said oil by adding an aqueous de-gumming agent thereto to hydrate said gums and render them insoluble in said oil and separating from said oil hydrated gums containing a substantial amount of said oil, thereafter admixing a liquefied, normally gaseous hydrocarbon such as propane with the hydrated gums and maintaining the resulting mixture under sufficient pressure to retain said hydrocarbon in liquid form, bringing said mixture to a temperature producing a solvent phase containing said liquefied hydrocarbon and said oil and an aqueous phase containing said gums while said gums contain sufficient water to produce a liquid aqueous phase, separating said two phases, recovering de-oiled gums from said aqueous phase and vaporising said hydrocarbon from said solvent phase to recover oil therefrom.

The use of a normally gaseous hydrocarbon such as propane necessitates the installation to be explosion-proof which requires a considerable additional investment. Moreover, liquefaction and evaporation of this hydrocarbon require energy and thus augment the operating cost of the recovery process. Consequently, the crushing industry would welcome a cheaper process to recuperate triglyceride oil contained in wet gums.

During the water degumming process leading to the wet gums not all phosphatides present in the crude oil are hydrated. Some phosphatides that are commonly referred to as non-hydratable phosphatides (NHP), remain dissolved in the oil even after repeated water degumming treatments. Since these NHP have to be removed if the oil is subsequently to be neutralised by the steam refining process, more effective degumming processes have been developed that result in lower residual phosphatide contents than the water degumming process.

Several of these more effective degumming processes have in common that they treat the crude oil to be degummed with an aqueous acid in order to decompose the NHP which consist mainly of calcium and magnesium salts of phosphatidic acid. For this decomposition to be effective, the degumming acid has to be stronger than phosphatidic acid, and phosphoric acid or citric acid are commonly used for this purpose. U.S. Pat. No. 4,049,686 discloses that phosphatides and other minor components can be advantageously removed from crude or water-deslimed triglyceride oils which are substantially liquid at 40° C., by dispersing an effective amount of a substantially concentrated acid or anhydride, having a pH of at least 0.5 as measured at 20° C. in a one molar aqueous solution, in the oil, subsequently dispersing 0.2 to 5% by weight of water in the mixture obtained, and finally separating an aqueous sludge containing the gums from the oil, the mixture of oil, water and acid being maintained for at least 5 minutes at a temperature below 40° C. before separating the aqueous sludge.

European Patent No. 195,991 discloses producing de-gummed vegetable oils and gums of high phosphatidic acid content by removing non-hydratable phosphatides and iron from water de-gummed vegetable oils, comprising the steps of:

finely dispersing a non-toxic aqueous acid in the water de-gummed oil so as to form an interface between the acid droplets and the oil of at least $0.2 \text{ m}^2$ per 100 g of oil, and allowing sufficient contact time to complete decomposition of the phosphatidic acid metal salts; and mixing a base into the acid-in-oil dispersion in such amount that the pH of the aqueous phase is increased to above 2.5 but no substantial amount of soap is produced.

Yet another acid degumming process has been described in U.S. Pat. No. 6,172,248. In this process, vegetable oil is combined with a dilute aqueous organic acid solution and subjected to high shear to finely disperse the acid solution in the oil. The resulting acid-and-oil mixture is then mixed at low shear for a sufficient length of time to sequester contaminants into a hydrated impurities phase, producing a purified vegetable oil phase. Example 1 of this patent illustrates that the resulting oil is indeed highly purified and differs strongly from conventionally water degummed vegetable oil. Whereas according to Table 1 in U.S. Pat. No. 6,172,248 the latter oil contains 50 ppm magnesium, 80 ppm calcium and 150 ppm phosphorus, the organic refined oil contains <5 ppm magnesium, <5 ppm calcium and <10 ppm phosphorus. This means that the composition of the hydrated gums resulting from the organic refining process will also differ substantially from that resulting from the conventional water degumming process. Whereas the latter comprises only hydratable phosphatides, the gums resulting from the organic refining process also contain the NHP or rather their decomposition products such as for instance the sodium salt of phosphatidic acid.

Finally, U.S. Pat. No. 6,426,423 discloses a process for treating a phosphatide-containing mixture that comprises the steps of providing a phosphatide-containing mixture obtained from an organic acid refining process; separating the phosphatide-containing mixture into a purified vegetable oil phase and a phosphatide-enriched aqueous phase; and removing the purified vegetable oil phase. Typically, the purified vegetable oil phase migrates to the top, the phosphatide phase migrates to the middle and the aqueous organic acid phase migrates to the bottom. The purified vegetable oil phase can be separated by any convenient method, although preferably it is decanted away from the other two phases.

Accordingly, the process described in U.S. Pat. No. 6,426,423 allows oil contained in wet gums to be recuperated and thus to reduce the oil loss during the crushing process, but it has the disadvantage of being limited to the organic refining process as described in U.S. Pat. No. 6,172,248 and employing additives like organic acids and also aiming at producing an oil with a low residual phosphorus content. This oil recuperation process is therefore of little use to the crushing industry who wants to supply the market with vegetable oils containing as much phosphatides as permitted by the trading specifications and who want to maximise their crude oil yield at the same time.

In the crushing industry, vegetable oils are commonly just water degummed to reduce the risk that the oils throw a deposit on transport and storage and to ensure that the refiner buying this crude oil suffers only limited refining losses. The gums resulting from the water degumming process may be dried to yield lecithin but since the potential availability of lecithin far exceeds the demand, most gums are mixed with the meal in the crushing plant and then sold at meal value, which is fully in line with existing regulations since this mixing is confined to an integrated operation. Moreover, the only lecithin being traded in appreciable amounts is soy lecithin which means that wet gums originating from the water degumming of for instance rapeseed oil or sunflower seed oil are hardly ever dried as such and thus normally mixed with their meals.

OBJECTS OF THE INVENTION

It is therefore an object of the invention to provide the crushing industry with a simple process that maximises the oil yield of the crushing operation.

It is also an object of the invention to provide a process avoiding the use of volatile organic solvents.

It is a yet another object of the invention to enable the crushing industry to minimise the oil content of the phosphatides it will mix into his meal.

Further objects and advantages of the invention will become apparent from the description hereinafter.

SUMMARY OF THE INVENTION

It has surprisingly been found that mixing water containing a phospholipidolytic agent into the wet gums resulting from the water degumming process of a vegetable oil causes these gums to separate into several phases, the uppermost of which consists of triglyceride oil, which oil can be advantageously be recuperated as crude oil.

Accordingly, the present invention provides a process for recuperating triglyceride oil from wet gums from a vegetable oil, comprising the steps of:
(a) providing wet gums by water degumming of a crude vegetable oil,
(b) mixing these wet gums with water containing an effective amount of a phospholipidolytic agent,
(c) allowing the mixture to separate into two or more phases, said two or more phases including at least an oily phase and an aqueous phase,
(d) recuperating said oily phase, and
(e) optionally recuperating and recycling the aqueous phase to the water degumming step.

DEFINITIONS

As used herein, and unless otherwise stated, the term "meal" refers to a solvent-free oil seed extraction residue.

As used herein, and unless otherwise stated, the term "gum" refers to the mucilaginous matter isolated from oils during a degumming step.

As used herein, and unless otherwise stated, the term "phospho-lipidolytic" refers to the hydrolysis of phospholipids.

DETAILED DESCRIPTION OF THE INVENTION

In step (a), wet gums can conveniently be obtained by treating crude vegetable oil such as soybean oil, rapeseed oil, sunflower seed oil and the like with warm water or live steam. This treatment is preferably carried out immediately after the extraction solvent has been removed from the oil miscella by evaporation. At that point in time, the crude oil has a temperature that hardly needs any adjusting for the water degumming process to be carried out.

The amount of water to be used in the water degumming process varies but it is commonly about equal to the amount of mucilaginous matter to be removed from the crude oil by the water degumming process. Accordingly, the wet gums obtained by this process usually have a water content in the range of 40 to 60% by weight, but the process of the invention is in no way limited to a starting material with this water content.

The temperature of the wet gums will hardly have changed during the water degumming process so that it will preferably be in the range of about 40 to 90° C. Accordingly, the expense of heating or cooling the wet gums can often be avoided but the process of the invention in no way excludes a temperature adjustment of the wet gums before they are mixed with water containing a phospholipidolytic agent in step (b).

This mixing step (b) is preferably carried out continuously but a batch operation is also possible. It has been found to be advantageous to mix the wet gums with the water containing a phospholipidolytic agent as soon as they become available from the water degumming process. Then, these gums can still be considered to be sterile but when cooled and infected they may become subject to microbial spoilage. On the other hand, this spoilage is effectively avoided by the use of an acid phospholipidolytic agent. The water to be mixed into the wet gums is preferably brought to about the same temperature as that of the wet gums before being mixed with these gums but on the other hand, the water temperature can also be used to adjust the temperature of the mixture. If it is for instance deemed to be desirable that this temperature after mixing is lower than the temperature of the wet gums, the water to be mixed with the wet gums can be brought to a temperature that is lower than the temperature after mixing. This may be desirable when an enzymatic phospholipidolytic agent is employed.

The amount of water to be mixed with the wet gums has been found to be hardly critical. Mixtures with a dry matter content of about 15 weight % have been found to permit a good oil recuperation but this dry matter content can also be as high as about 40 weight % or even higher. Since according to the invention this mixture will subsequently undergo a separation step (c) and an oil recuperation step (d), the volume of the mixture is therefore preferably minimised to a dry matter content of about 30 to 40 weight %.

The acid which may be used as phospholipidolytic agent has been found not to be critical but food grade acids such as phosphoric acid or citric acid are preferred.

Accordingly, citric acid aqueous solutions with acid concentrations as low as about 3 weight % and as high as about 30 weight % have been found to be effective in hydrolysing the phospholipids present in the wet gums. However, lowering concentrations increases the holding time required for oil separation and the amount of recuperated oil may also be less than when for instance an acid concentration of about 9 weight % is employed. Using much higher concentrations than about 9 weight % offers no significant advantages and although the acid water phase can be recycled, (step e) a high acid concentration also leads to an increased consumption of the acid.

Another phospholipidolytic agent that can profitably be used in the process according to the invention is a phospholipase, preferably a hydrolytic enzyme like Lecitase Ultra as produced by Novozymes AS (Bagsvaerd, Denmark). This is a microbial enzyme produced by *T. lanuginosa* and which acts as a phospholipase A1. Without wishing to be bound by theory, it is believed that this enzyme does not operate at the oil-water interface but rather in the oily phase. The optimum temperature for using this enzyme is usually within a range from about 50° C. to 60° C. (depending upon pH, as is well known to the skilled person), which means that the wet gums may have to be cooled down to or around this temperature before enzyme addition.

The amount of enzyme to be used is again not critical. An amount within a range of about 50 ppm to 1,000 ppm, preferably 100 ppm to 250 ppm (ranges based on the following text and suggested claim 5) calculated on the basis of dry matter to be treated has been found to be effective. Much higher amounts are unnecessary for the efficiency of the invention. Recycling the enzyme solution may be performed if necessary, depending upon the balance between enzyme consumption and cost for recycling.

The mixing operation itself must ensure that the phospholipidolytic agent is thoroughly mixed through the wet gums. Accordingly, an industrial execution of the process of the invention preferably employs a high shear, in-line mixer such as used for example for mixing caustic soda with oil during the chemical neutralisation process of edible oils. These can be rotary mixers such as for instance commercially available from Westfalia Separator Food Tec GmbH, Oelde, Germany, or static mixers of the Kenics type.

The separation stage (c) of the process according to the invention can be carried out in various ways, depending upon the oil recuperation method to be used subsequently. If this recuperation (d) is by overflow from a holding vessel, the contents of this vessel should preferably not be agitated. If on the other hand, the recuperation is by use of a decanter or centrifugal separator, a reasonably homogenous feed to this piece of equipment is preferred. Then a gentle agitation of the holding vessel is preferably required to prevent its contents from settling.

According to the process of the invention, a certain minimum holding time during the separation stage (c) between the high shear mixing stage (b) and the oil recuperation stage (d) is preferably required for the oil exudation to take place. Macroscopically it can be observed that the fine and stable emulsion that is characteristic of the wet gums as obtained during water degumming gradually changes into a much coarser and less stable emulsion. This reduced stability manifests itself by oil moving upwards and an aqueous phase moving downwards when the mixture of the wet gums and the acidified water is left stagnant. However, in the process of the invention, three or even four different phases can be observed during this separation stage (c).

The rate of oil exudation has been observed to vary with time. In the beginning, little seems to happen and the rate is low or even zero. Then an oily top layer is formed at increasing rate but after a while, this rate decreases again. Finally, macroscopic changes become hardly noticeable. At that point in time, there is no need to continue the separation stage but it could have been terminated before, for instance when the rate had dropped to about one third of the maximum rate observed.

The top layer (1) is the oily layer to be recuperated. Since the recuperation process according to the invention employs a phospholipidolytic agent, the phosphatides present in the wet gums will be partially hydrolysed during step (c) of the process, which hydrolysis will lead to the liberation of free fatty acids. These acids are oil-soluble and will thus be concentrated in the oil present in the system and thus also in the top layer (1). Accordingly, the recuperation process according to the invention does not only liberate neutral oil from wet gums, it also liberates free fatty acids from phosphatides and then incorporates these free fatty acids into this neutral oil. Since this is the oil to be recuperated and subsequently sold as crude oil, the phospholipidolytic agent thus increases the amount of crude oil to be sold and thus the profitability of the process.

Bottom layer (4) contains the phospholipidolytic agent and is therefore preferably recycled. However, the aqueous bottom layer may become enriched in water-soluble compounds present in the wet gums such as sugars. Therefore a certain purge may become desirable whereby the extent of the purge mainly depends upon the agricultural origin of the crude oil. This purge is only necessary when the purge provided by the intermediate layers (2) and (3) is found to be insufficient.

The two intermediate layers (2) and (3) contain the partially hydrolysed phosphatides. They also contain the triglyceride oil that has not floated to the top layer (1) and part of the aqueous phase.

Accordingly, the separation between the various layers need not be perfect. If the recuperated oil in top layer (1) contains a bit of layer (2), this will usually not cause the crude oil to which this layer is sent to be outside the crude oil specification. Similarly, if the aqueous bottom layer contains some phosphatides, these may be separated from the aqueous layer next time and thus sent to the meal that time. The use of a three-phase decanter that simultaneously isolates the oily phase (1) and the aqueous bottom phase (4) from the two intermediate phases has been found to be advantageous and is therefore preferably recommended.

The following examples are provided for illustration only and should in no way be understood as restricting the scope of the present invention.

Example 1

Comparative

This illustrates the stability of wet gums as obtained by water degumming crude vegetable oil. A sample of wet gums resulting from water degumming crude soybean oil was analysed and found to contain 41.9 weight % of water. Its dry matter was also analysed and found to contain 37.3 weight % acetone soluble matter with a 5.7% free fatty acid content (expressed as oleic acid) and 2,335 ppm of phosphorus.

An amount of 574 g of these wet gums was heated to 75° C. and mixed with warm distilled water to obtain a total weight of 1,060 g and agitated at 350 rpm for 1 hour. The mixture was then transferred to a 1 L measuring cylinder and placed in a water bath kept at 70-80° C. The cylinder was monitored regularly for phase separation but quite soon an aqueous bottom layer was observed but even after 48 hours only a very few drops of oil could be observed at the surface of the mixture.

Apparently, under the conditions employed in this example, the wet gums form a quite stable emulsion that does not allow any oil to be recovered.

Example 2

The same sample of wet gums as in example 1 was used in an experiment involving acidified water. This acidified water contained 5% by weight of citric acid. The same weights of wet gums (i.e. 574 g) and water (i.e. 486 g) were used as in example 1 and the mode and time of mixing were also the same. However, the behaviour of the mixture in the measuring cylinder was totally different. When the cylinder was filled, a water phase of 150 ml separated almost immediately and after 1 hour, this phase had increased to 210 ml. After 2 hours, an oily top layer could be noted that was still quite small (<10 ml), but at 4 hours after filling the cylinder, this oily layer had increased to 20 ml, the aqueous bottom layer had increased to 310 ml so that the layer in between had decreased to 670 ml.

During the remainder of the experiment the oily top layer increased to 60 ml and the aqueous bottom layer increased to 610-620 ml. Very surprisingly the intermediate phase separated into two distinct layers, the upper one of which reached a volume of some 200 ml at 48 hours after filling the cylinder so that the lower layer accounted for 150 ml.

Analysis of the oily top layer revealed that its free fatty acid content had increased considerably from 5.7% to 28.4%; its phosphorus content (2,635 ppm) had hardly increased in comparison with the crude oil. Accordingly, this oily layer could be recuperated in full by mixing it with the crude, water degummed oil.

Example 3

In a similar experiment as example 2, but employing 800 g of the same citric acid solution (5% by weight) and 200 g of the same wet gums, the phosphatide compositions of the two intermediate phase layers were determined, by using $^{31}$P-NMR (nuclear magnetic resonance), by Spectral Service GmbH (Cologne, Germany). This determination showed that the lyso-content of the phosphatides had increased from 1.7% in the starting material to 45.3% in the upper phosphatide layer (110 ml) and even to 51.2% in the lower phosphatide layer (20 ml). Accordingly, the average lyso-content of the two layers was 46.2% and had thus increased by 44.7%. The citric acid had thus acted as phospholipidolytic agent.

The acetone insoluble content of the gums used as starting material in this experiment was 35% so that about 70 g phosphatides were used. Hydrolysing these 70 g phosphatides to 46.2% lyso-phosphatides liberated some 15 g of free fatty acids. The acetone soluble fraction was 21.5% so the amount of triglyceride oil present in this experiment was 43 g. The oily layer (30 ml or 27 g) showed a free fatty acid content (by titration) of 29.9% so that the total amount of free fatty acids present in the original 43 g of oil is some 18 g. This figure is quite close to the amount of free fatty acids formed by the hydrolysis of the phosphatides during the process according to the invention. Accordingly, the process according to the invention only causes phospholipids to hydrolyse and leaves triglyceride oil intact.

Example 4

Again the sample of wet gums as described in Example 1 was used to study the effect of the use of a phospholipase enzyme on oil recuperation. The amount of wet gums was 583 g and these were mixed with 477 g water containing Lecitase Ultra (Novozymes AS, Bagsvaerd, Denmark). The amount of the enzyme was 250 ppm calculated on the dry matter in the gums. The mixture was held at 55 C.

Very little happened in the beginning and after 5 hours no phase separation could be observed at all. However, after some 20 hours, four distinct layers were clearly visible and after 92 hours, the oily upper layer, having a free fatty acid content of 24.7% amounted to 70 ml. Given the dry matter content of the gums of 58.1% and the acetone soluble content of the dry matter of 37.3%, this corresponds to some 126 g in this example. Thus a recuperation of 70 ml (63 g) amounts to some 50% of theory when the free fatty acids are not taken into account.

Example 5

A different sample of wet gums was used in this example. It was also obtained by water degumming soybean oil and its water content was 46.0%. On a dry basis its impurities content (hexane insoluble) was 2.1%, its acetone insoluble content was 64.4% and thus its acetone soluble content was 33.5%. An amount of 554 g of gums was mixed with about 370 g of four different citric acid solutions with concentrations of 1%, 3%, 9% and 30% by weight respectively at a temperature of 75° C. The mixtures were agitated for a period of 1 hour at 120 rpm whereupon they were transferred to measuring cylinders that were positioned in a water bath kept at 70-80° C.

No oily layer appeared in the measuring cylinder containing the mixture prepared with the 1% citric acid solution. Apparently, this acid concentration is insufficient for phospholipidolytic activity. The 3% by weight concentrated solution caused an oily layer of 10 ml to appear after some 30 hours, which layer increased to 25 ml after 40 hours and stabilised at 30 ml after 48 hours. This leads to the conclusion that an acid concentration of 3% citric acid already has a marked phospholipidolytic activity.

Higher acid strengths have a higher activity since the oily layer resulting from an acid concentration of 9% by weight amounted to 30 ml after 20 hours and even 40 ml after 48 hours. Increasing the acid concentration to 30% by weight led to both a faster oil separation and a more extensive separation in that a layer of some 10 ml was already discernable after 4 hours and that the final layer amounted to 50 ml attained after 65 hours.

Example 6

In this example phosphoric acid was used as the phospholipidolytic agent. An acid concentration of 9% by weight was chosen and the temperature was 75° C. Using again some 554 g of wet gums (same as used in example 5) and 373 g phosphoric acid solution, an oily phase of 50 ml (45.6 g) resulted after some 48 hours. This oily phase had a free fatty acid content of 31.5%. It also had a higher phosphorus content than the samples treated with citric acid according to examples 2 to 5.

Analysis of the phosphatide layer showed its lyso-content to be 40% which is well in line with the free fatty acid content of the oily layer. The example also shows that the chemical nature of the phospholipidolytic acid is not critical.

Example 7

Using the gum sample of examples 5 and 6, Lecitase Ultra was employed as a phospholipidolytic agent in an amount of 250 mg per kg dry gum matter and at a temperature of 55° C. Again, the appearance of an oily layer was slow in that after 6 hours no oily drops could yet be discerned; these appeared after some 30 hours and after 120 hours the oily layer amounted to 77% of the oil present in the gums. In addition, the phosphorus content of the oily layer at 65 ppm was lower than with any other phospholipidolytic agent studied and this also holds for the iron, calcium and magnesium contents of the oily layer resulting from the use of the phospholipase enzyme. The oily layer also had a less pronounced colour than attained by the use of an acid phospholipidolytic agent in examples 2 to 6.

The invention claimed is:

1. Process for recuperating a triglyceride oil from vegetable oil wet gums, said process comprising the steps of:
   (a) providing wet gums by water degumming a crude vegetable oil,
   (b) mixing said wet gums with water containing a phospholipidolytic agent to form a mixture,
   (c) allowing the mixture to separate into two or more phases, said two or more phases including an oily phase and an aqueous phase, and
   (d) recuperating said oily phase.

2. Process according to claim 1, wherein said phospholipidolytic agent is an acid.

3. Process according to claim 1, wherein said phospholipidolytic agent is an aqueous acidic solution having a concentration between about 3 and about 30 weight percent of an acid selected from the group consisting of citric acid and phosphoric acid.

4. Process according to claim 1, wherein said phospholipidolytic agent is a phospholipase.

5. Process according to claim 1, wherein said phospholipidolytic agent is a phospholipase in an amount from about 50 to about 1,000 ppm calculated on dry matter contained in said wet gums.

6. Process according to claim 1, wherein dry matter content in the mixture prepared in step (b) is between about 15 and about 40 weight percent.

7. Process according to claim 1, wherein said phospholipidolytic agent is an aqueous acidic solution having a concentration between 3 and 30 weight percent of an acid selected from the group consisting of citric acid and phosphoric acid and wherein dry matter content in the mixture prepared in step (b) is between about 15 and about 40 weight percent.

8. Process according to claim 1, wherein said phospholipidolytic agent is a phospholipase and wherein dry matter content in the mixture prepared in step (b) is between about 15 and about 40 weight percent.

9. Process according to claim 1, wherein the temperature during step (c) is maintained between about 40 and about 90° C.

10. Process according to claim 1, wherein said phospholipidolytic agent is an aqueous acidic solution having a concentration between 3 and 30 weight percent of an acid selected from the group consisting of citric acid and phosphoric acid and wherein the temperature during step (c) is maintained between 40 about and about 90° C.

11. Process according to claim 1, wherein said phospholipidolytic agent is a phospholipase and wherein the temperature during step (c) is maintained between about 40 and about 90° C.

12. Process according to claim 1, wherein step (c) is terminated when the rate of increase of the oily phase has dropped to below one third of its maximum rate.

13. Process according to claim 1, wherein the oily phase from step (d) is recuperated by decantation.

14. Process according to claim 1, wherein the oily phase from step (d) is recuperated by centrifugal separation.

15. Process according to claim 1, wherein the aqueous phase from step (c) is substantially recycled to step (b).

16. Process according to claim 1, wherein said phospholipidolytic agent is an aqueous acidic solution having a concentration between about 3 and about 30 weight percent of an acid selected from the group consisting of citric acid and phosphoric acid and wherein the aqueous phase from step (c) is substantially recycled to step (b).

17. Process according to claim 1, wherein step (c) is terminated when the rate of increase of the oily phase has dropped to below one third of its maximum rate and wherein the aqueous phase from step (c) is substantially recycled to step (b).

18. Process according to claim 1, wherein the temperature during step (c) is maintained between about 40 and about 90° C. and wherein the aqueous phase from step (c) is substantially recycled to step (b).

19. Process according to claim 1, wherein said phospholipidolytic agent is an aqueous acidic solution having a concentration between 3 and 30 weight percent of an acid selected from the group consisting of citric acid and phosphoric acid, wherein the temperature during step (c) is maintained between about 40 and about 90° C. and wherein the aqueous phase from step (c) is substantially recycled to step (b).

20. Process according to claim 3, wherein said acid is citric acid.

21. Process according to claim 3, wherein said acid is phosphoric acid.

22. Process according to claim 4, wherein said phospholipase is a hydrolytic enzyme.

23. Process according to claim 22, wherein said hydrolytic enzyme is Lecitase® Ultra.

24. Process according to claim 1 wherein said wet gums contain only hydratable phosphatides therein.

25. Process according to claim 1 wherein said wet gums have a water content of 40-60 wt %.

* * * * *